(12) United States Patent
Johnson

(10) Patent No.: US 10,279,463 B1
(45) Date of Patent: May 7, 2019

(54) APPARATUS FOR ASSISTING WITH WALL BOARD CUTTING

(71) Applicant: Clement Johnson, Piedmont, SC (US)

(72) Inventor: Clement Johnson, Piedmont, SC (US)

( * ) Notice: Subject to any disclaimer, the term of this patent is extended or adjusted under 35 U.S.C. 154(b) by 0 days.

(21) Appl. No.: 15/838,794

(22) Filed: Dec. 12, 2017

(51) Int. Cl.
  *B23Q 11/00* (2006.01)
  *B25H 1/00* (2006.01)
  *B25H 1/02* (2006.01)
  *E04B 2/72* (2006.01)

(52) U.S. Cl.
  CPC ....... *B25H 1/0078* (2013.01); *B23Q 11/0046* (2013.01); *B23Q 11/0067* (2013.01); *B25H 1/02* (2013.01); *E04B 2/723* (2013.01); *Y10T 409/304088* (2015.01)

(58) Field of Classification Search
  CPC .............. B23Q 11/006; B23Q 11/0046; B23Q 11/0053; B23Q 11/0067; Y10T 409/306216; Y10T 409/306384; Y10T 409/304088
  USPC .......................................................... 15/303
  See application file for complete search history.

(56) References Cited

U.S. PATENT DOCUMENTS

| | | | | |
|---|---|---|---|---|
| 4,092,889 A * | 6/1978 | Fisher | ................... | B23K 7/002 83/177 |
| 7,467,449 B1 * | 12/2008 | Lee | ......................... | B23B 39/06 29/26 A |
| 7,507,060 B2 * | 3/2009 | Grisley | ................ | B23Q 9/0042 144/144.1 |
| 7,845,090 B2 | 12/2010 | Ruppe, III | | |
| 7,896,041 B2 * | 3/2011 | Becker | ............... | B23Q 11/0046 144/252.2 |
| 7,935,887 B2 | 5/2011 | Petak | | |
| 8,240,347 B2 | 8/2012 | Ishida | | |
| 2005/0178014 A1 | 8/2005 | Tepei | | |
| 2005/0217129 A1 | 10/2005 | Boys | | |
| 2010/0043239 A1 | 2/2010 | Pittmann | | |

FOREIGN PATENT DOCUMENTS

| | | | | |
|---|---|---|---|---|
| CN | 202097830 U | 1/2012 | | |
| CN | 205660699 U | 10/2016 | | |
| DE | 102012212391 A1 * | 1/2014 | ............... | B23Q 3/02 |
| EP | 0140794 A1 * | 5/1985 | ............... | B23Q 5/34 |

* cited by examiner

*Primary Examiner* — Daniel W Howell
(74) *Attorney, Agent, or Firm* — Burr & Forman LLP; Hunter S. Freeman

(57) ABSTRACT

The present invention relates to an apparatus for assisting with the quick and accurate cutting of a piece of wall board or the like for installation. When installing wall board, it is important that it fits tightly to the ceiling or wall against which the wall board is being installed. The invention generally includes a frame on which a piece of dry wall can be placed and at least one cutting template that comprises a first cutting guide disposed within a first cutting slot that is carried by the frame. The first cutting slot and first cutting guide define a first cutting channel that is adapted to receive a cutting tool and to guide the cutting tool along the first cutting guide so that the dry wall can be cut to match the pattern of the cutting guide.

20 Claims, 8 Drawing Sheets

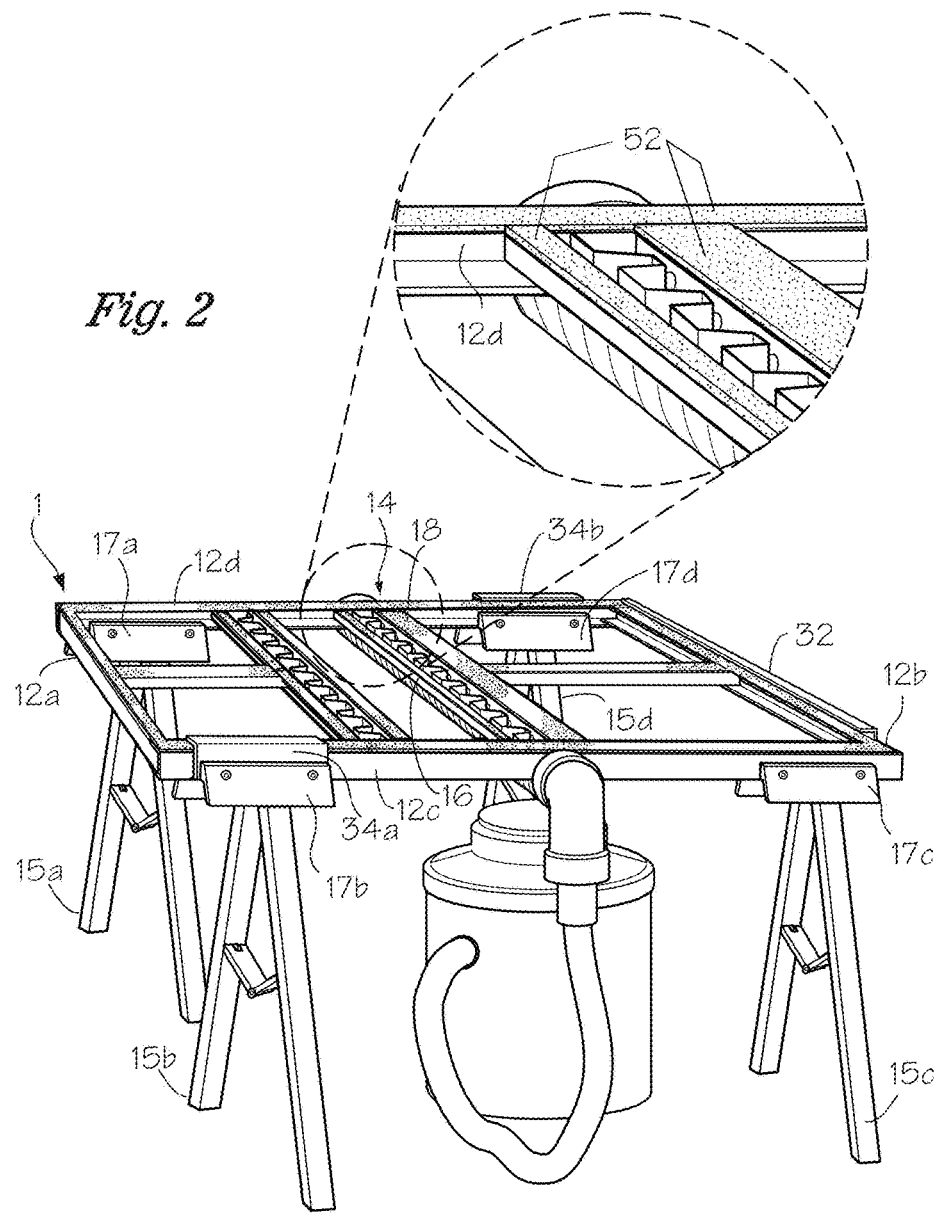

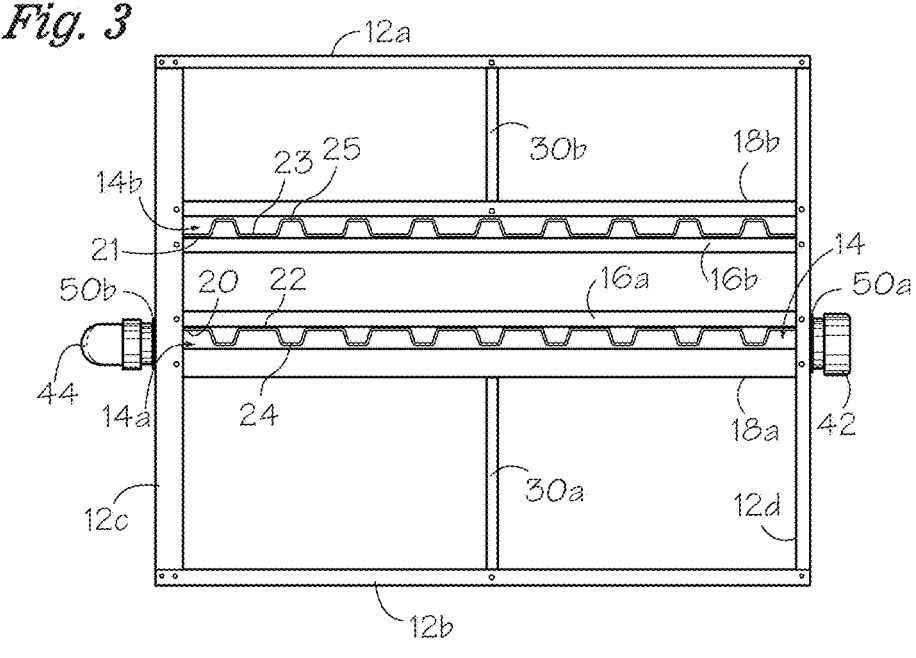
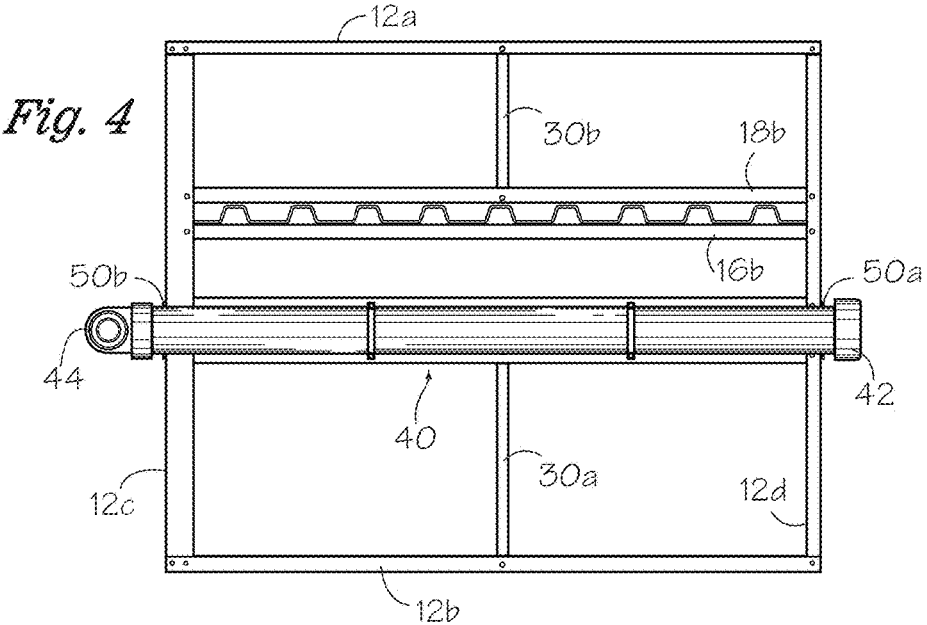

APPARATUS FOR ASSISTING WITH WALL BOARD CUTTING

BACKGROUND OF THE INVENTION

1) Field of the Invention

The present invention relates to an apparatus for assisting with the quick and accurate cutting of a piece of wall board or the like for installation. When installing wall board, it is important that it fits tightly to the ceiling or wall against which the wall board is being installed. This is especially true when installing wall board against a fluted ceiling, as is commonly done in commercial structures. When installing wall board against a fluted ceiling deck, any gap between the wall board and the ceiling deck must be filled with a fire resistant caulk, which is costly. Thus, minimizing the gap that must be filled is important.

The present invention relates to an apparatus that can assist with cutting a piece of wall board to conform to the contours or edges of the wall or ceiling against which the wall board is to be installed.

2) Description of Related Art

Traditionally, wall board has been cut by hand to conform it to the edges or contours of the ceilings and walls against which the wall board is to be installed. This task is not difficult if the edge to which the wall board must conform is relatively straight. This task becomes increasingly difficult when dealing with ceilings or walls that contain non-straight edges or numerous edges which must be cut into the wall board. This is the case in commercial structures, where often the ceiling is fluted or created from fluted decking panels. Generally, fire and building codes for these structures require interior walls to run from the floor to the bottom of the fluted ceiling and to fit flush against the bottom of the ceiling so that there is no gap between the ceiling and the wall board.

In order to obtain the flush, gap free fit between the ceiling and edge of the wall board, the wall board must be cut to the shape of the ceiling prior to installation. Cutting the wall board by hand in this manner is labor intensive, thereby adding to the labor costs of the project. Moreover, hand cutting the wall board is not very accurate, meaning gaps that are larger than are desired are left between the wall board and the ceiling once installed. In accordance with fire and building codes, these gaps must be filled with a fire resistant caulk or other material. This caulk or similar material is often expensive, again adding to the cost of the project.

Accordingly, it is an object of the present invention to provide an apparatus having a cutting guide for accurately and quickly cutting the wall board to minimize any gaps between the wall board and the ceiling once installed.

It is another object of the present invention to provide an apparatus having a cutting guide that can be used to cut wall board having two different heights.

It is another object of the present invention to provide an apparatus having a frame that will support the weight of the wall board and to hold the wall board in the correct position with respect to the cutting guide while being cut.

It is another object of the present invention to provide an apparatus having a dust collection conduit for collecting and removing the dust created by the wall board when being cut.

It is another object of the present invention to provide an apparatus having the ability to replace and interchange a number of different cutting guides, thereby allowing the wall board to be cut in a number of different patterns prior to installation.

SUMMARY OF THE INVENTION

The above objectives are accomplished according to the present invention by providing an apparatus for assisting with the cutting of a piece of wall board comprising: a frame comprising a first longitudinal side, an opposing second longitudinal side a first latitudinal side and an opposing second latitudinal side, wherein said frame defines an upper surface adapted to receive and support a piece of wall board and a lower surface; a first cutting slot carried by said first and said second longitudinal sides of said frame, wherein said first cutting slot is defined by an upper boundary and a lower boundary and has an upper surface for supporting the wall board and a lower surface; a second a cutting slot carried by said extension frame and positioned so that said second cutting slot extends generally parallel to said first cutting slot, and said second cutting slot is defined by an upper boundary and a lower boundary; a dust collection conduit having a first end, a second end and a cross section that defines a substantially U shape, wherein said dust collection conduit is carried by said lower surface of said frame so that said dust collection conduit catches any dust that falls through said cutting slot and said dust collection conduit creates an air tight seal at the points of contacts with said lower surface of said first cutting slot.

In another embodiment, the invention further comprises a vacuum adapter disposed on said second end of said dust collection conduit so that when said vacuum adapter connects said dust collection conduit to a vacuum source, said dust collection conduit and said cutting slot are placed in fluid communication with the vacuum source so that dust collected by said dust collection conduit can be removed by the vacuum source; and, a sealing mechanism carried by an upper surface of said upper boundary and said lower boundary of said first cutting slot, said sealing mechanism being adapted to create a seal between said first cutting slot and the wall board when the wall board is received by said upper surface of said frame.

In another embodiment, the invention further comprises a first fluted cutting guide defining at least one peak and at least one trough, wherein said first cutting guide is carried by one of said upper boundary and said lower boundary of said first cutting slot so that only one of said at least one peak and said at least one trough contacts one of said upper boundary and said lower boundary of said first cutting slot; and, a first cutting channel defined by said first cutting guide and at least one of said upper and said lower boundary of said first cutting slot, wherein said first cutting channel is adapted to receive a cutting tool and to guide the cutting tool along said at least one peak and said at least one trough of said first cutting guide while the cutting tool is cutting the wall board.

In one embodiment, said at least one peak defined by said first fluted cutting guide has a width that is greater than the width of said at least one trough defined by said first fluted cutting guide and said ate least one peak is removably carried by said upper boundary of said first cutting slot so that said first cutting channel is defined by said first fluted cutting guide and said lower boundary of said first cutting slot.

In one embodiment, the invention further comprises a second fluted cutting guide defining at least one peak and at least one trough, wherein said second cutting guide is carried by one of said upper boundary and said lower boundary of said second cutting slot so that only one of said at least one peak and said at least one trough of said second cutting guide contacts one of said upper boundary and said lower boundary of said second cutting slot; and, a second cutting channel defined by said second fluted cutting guide and at least one of said upper and said lower boundary of said second cutting slot, wherein said second cutting channel is adapted to receive a cutting tool and to guide the cutting tool along said at least one peak and said at least one trough of said second fluted cutting guide while the cutting tool is cutting the wall board.

In one embodiment, said at least one peak defined by said first fluted cutting guide has a width that is greater than the width of said at least one trough defined by said first fluted cutting guide and said at least one peak is removably carried by said upper boundary of said first cutting slot so that said first cutting channel is defined by said first fluted cutting guide and said lower boundary of said first cutting slot and said second fluted cutting guide is positioned such that said second cutting channel mirrors said first cutting channel.

In one embodiment, said second fluted cutting guide is positioned such that said second cutting channel mirrors said first cutting channel.

In one embodiment, said first cutting slot is position such that the distance between said first latitudinal side of said frame and said first cutting slot is greater than the distance between said second latitudinal side of said frame and said second cutting slot.

In one embodiment, the invention includes an extension frame extending from said primary frame and comprising two opposing longitudinal sides and a latitudinal side interconnecting said longitudinal sides and said second cutting slot is carried by said two longitudinal sides.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 2 shows a perspective view of an embodiment of the present invention.

FIG. 3 shows a top plan view of an embodiment of the present invention.

FIG. 4 shows a bottom plan view of the present invention.

DETAILED DESCRIPTION OF A PREFERRED EMBODIMENT

Figure 1:
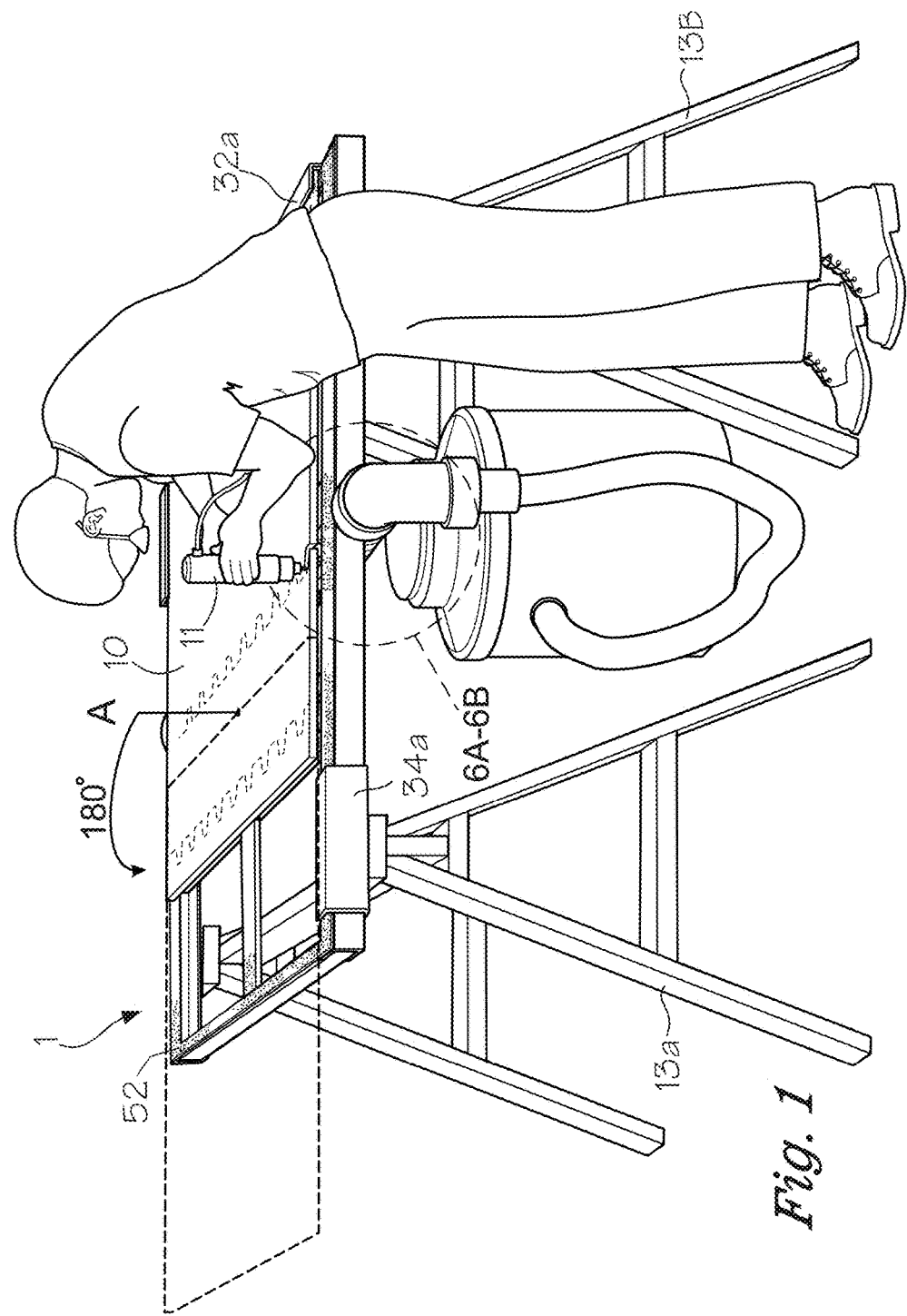
FIG. 1 shows a perspective view of an embodiment of the present invention.
Figure 5:
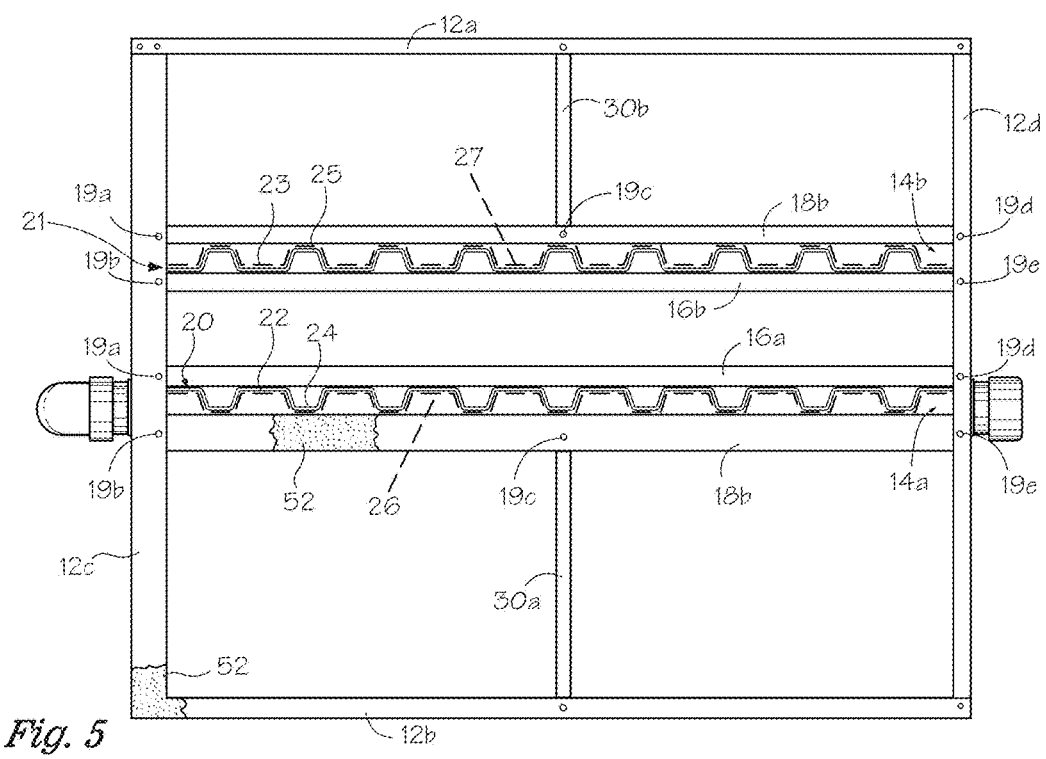
FIG. 5 shows a top plan view of an embodiment of the present invention.

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Referring now to FIGS. 1-5, an embodiment of the invention can generally be seen as 1. The invention generally relates to an apparatus for assisting with the cutting of a piece of wall board 10. The invention generally includes a frame 12 having four sides 12*a*-12*d* and on which a piece of dry wall 10 can be placed. The invention further includes at least one cutting template that comprises a first cutting guide 20 that is disposed within a first cutting slot 14*a* that is carried by the frame 12 such that the first cutting slot 14 and first cutting guide 20 define a first cutting channel 26 that is adapted to receive a cutting tool such as a router. The first cutting channel 26 guides the cutting tool along the first cutting guide 20 so that the dry wall can be cut to match the pattern of the cutting guide.

In the shown embodiment, the invention includes a second cutting template that mirrors the first template and comprises a second cutting guide 21 disposed within a second cutting slot 14b such that a second cutting channel 27 that mirrors the first cutting channel 26 is defined by the second cutting guide 21 and the second cutting slot 14b. In this embodiment, and as can be seen in FIG. 1, the first cutting template can be used by placing the dry wall on the upper surface of the frame 12 and placing a cutting tool 11 in the first cutting channel 26 and cutting the dry wall 10 along the first cutting guide 26. The second template can be used by rotating the dry wall 10 by 180 degrees as shown by the directional arrow A in FIG. 1. Once the dry wall is rotated and repositioned, the second cutting channel 27 can be used to guide the cutting tool 11 along the second cutting guide 21. In this embodiment, the distance between side 12b and first cutting template (and thus the first cutting slot 14a, the first cutting guide 20 and the first cutting channel 26) is greater than the distance between the opposing side 12a and the second cutting template (and thus the second cutting slot 14b, the second cutting guide 21 and the second cutting channel 27). This difference in distances allows patterns to be cut into the wall board at different heights.

In alternate embodiments, the first and second cutting templates will not mirror one another and instead will be identical in all respects except for the fact that the two cutting templates would be laterally spaced from one another. In such an embodiment, there would be no need to rotate the dry wall 10 in the direction shown as A on FIG. 1. In such an embodiment, the dry wall would simply be placed on the upper surface of the frame 12 and position so that either the first or second cutting template could be used to cut the dry wall. The spacing between the two cutting templates allows patterns to be cut into the wall board at different heights.

Figure 6:
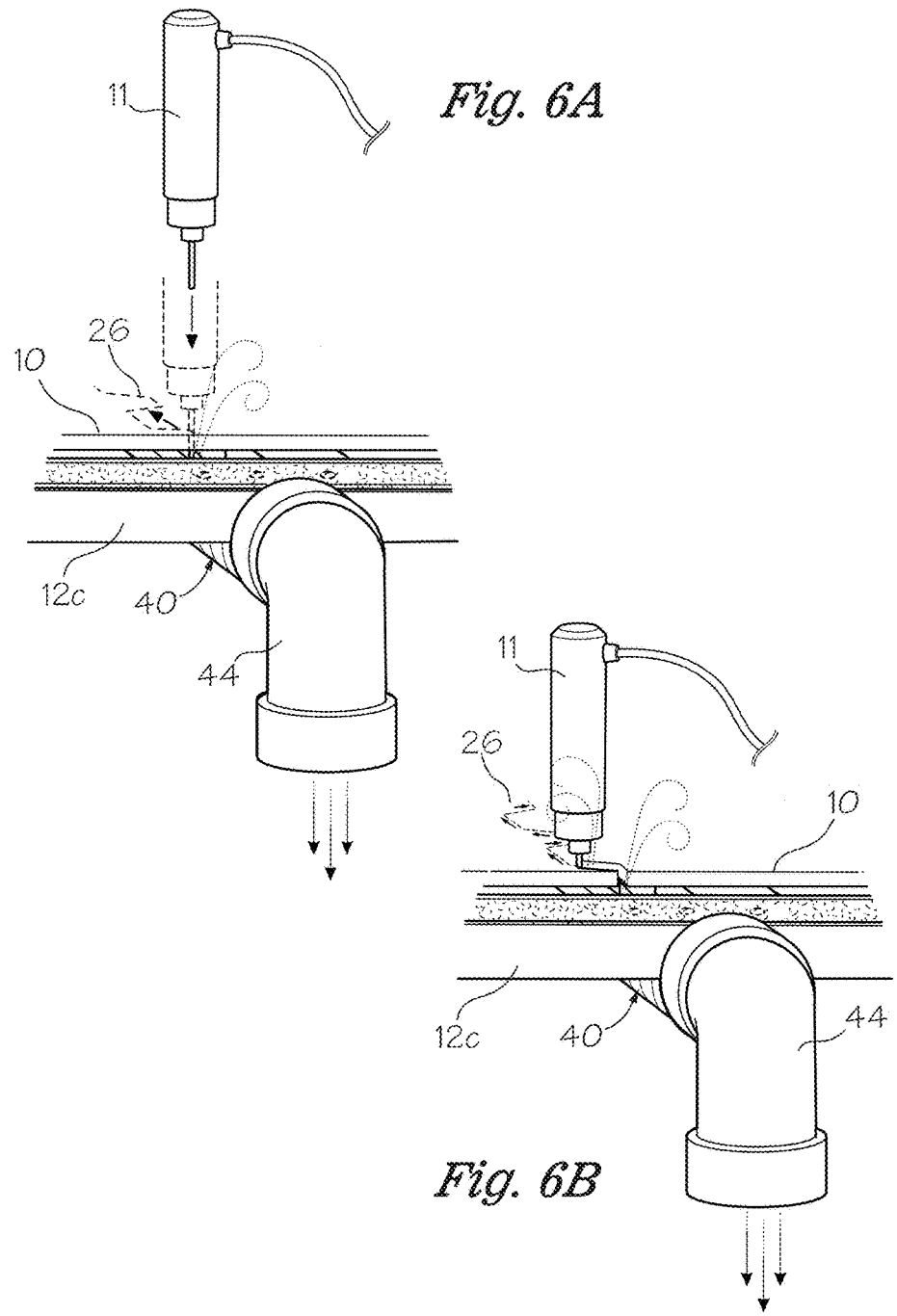
FIGS. 6A and 6B show a cut away perspective view of an embodiment of the present invention.

The frame 12 includes two opposing latitudinal sides 12a and 12b and two opposing longitudinal sides 12c and 12d. In at least one embodiment the frame has a width along the latitudinal sides of five feet and a length along the longitudinal sides of four feet. Alternate embodiments of the invention may use different widths and lengths but a width of at least four feet is preferred because dry wall is typically sold in sheets having a width of four feet. The shown embodiment has a sufficient length and width to properly support a piece of wall board on its upper surface. As can be seen in FIGS. 6A-6B, the shown embodiment has a width of five feet so as to allow sufficient room between the edge of the dry wall and the longitudinal sides 12c and 12d of the frame to allow the cutting blade 11 to be inserted into the cutting channels 26 and 27 without having to first penetrate the dry wall. In the embodiment shown in FIG. 1, a lower surface of the frame 12 is supported by standard saw horses 13a and 13b so as to hold the frame generally horizontal and at a desired height. In the embodiment shown in FIG. 2, the frame is held in place with stands 15a-15d having clamps 17a-17d that are adapted to clamp the frame into place. In either of the shown embodiments, the positioning of the frame with respect to the ground may be changed through the use of stands or saw horses of different and/or adjustable heights.

The shown embodiment also comprises two cutting slots, a first cutting slot 14a and a second cutting slot 14b. Both cutting slots are defined by an upper boundary 16a and 16b and a lower boundary 18a and 18b. The upper and lower boundaries 16a-16b and 18a-18b are carried by the longitudinal frame sides 12c and 12d so that the cutting slots 14a-14b extend generally parallel to the latitudinal frame sides 12a and 12b. The cutting slots 14a and 14b mirror one another so that the upper boundaries 16a-16b are closer to one another than are the lower boundaries 18a-18b, which are more laterally spaced. As discussed above, however, in embodiments where the two cutting templates do not mirror one another, the cutting slots would not mirror one another and would instead be identical in all respects except for the fact that they are laterally spaced from one another.

In alternate embodiments, the invention only includes a single cutting slot 14a. In such an embodiment, the upper boundary 16a and/or the lower boundary of the cutting slot 14a could be one of the lateral sides 12a or 12b of the frame such that one or both of the latitudinal sides also serve as one or both of the upper and lower boundaries 16a and 18a.

The first cutting slot 14a includes a first fluted cutting guide 20, which is carried by one or both of the first cutting slot's upper and lower boundaries 16a and 18a. In the shown embodiment, the first cutting guide 20 is carried by the upper boundary 16a so that the peaks 22 contact the first cutting slot's upper boundary 16a while the troughs 24 are laterally spaced from the lower boundary 16b of the first cutting slot 14a. In alternate embodiments, however, the first cutting guide 20 could be carried by the lower boundary 18a or both the upper and the lower boundaries 16a and 18a and could be carried by means of bolts, screws, rivets, adhesive or any other fastening means generally known. In the shown embodiment, the first cutting guide 20 is removably carried by the upper boundary 16a but could also be removably carried by the lower boundary 18a. In alternate embodiments, the first cutting guide 20 could be integral with one or both of the upper and lower boundaries through the use of welding or other fastening techniques that are generally known.

The second cutting slot 14b includes a second fluted cutting guide 21 having at least one peak 23 and one trough. The second cutting guide 21 may be carried by one or both of the second cutting slot's upper and lower boundaries 16b and 18b in the same manner as the first cutting guide 20 is carried by the upper and/or lower boundaries 16a and 18a of the first cutting slot 14a. Because the second cutting slot 14b mirrors the first cutting slot 14a, placement of the second cutting guide 21 in the same manner as the first cutting guide 20 will result in the second cutting guide mirroring the first cutting guide such that the peaks 22 and 23 of the cutting guides will be closer together than the troughs 24 and 25.

The first cutting guide 20 includes at least one peak 22 and one trough 24 and preferably a series of alternating peaks and troughs. A first cutting channel 26 is defined by a lower surface of the first cutting guide 20 and the lower boundary 18a of the first cutting slot 14a. Similarly, the second cutting guide 21 includes at least one peak 23 and one trough 25 and preferably a series of alternating peaks and toughs. The second cutting channel 27 is defined by a lower surface of the second cutting guide 20 and the lower boundary 18b of the second cutting slot 14b.

Figure 8:
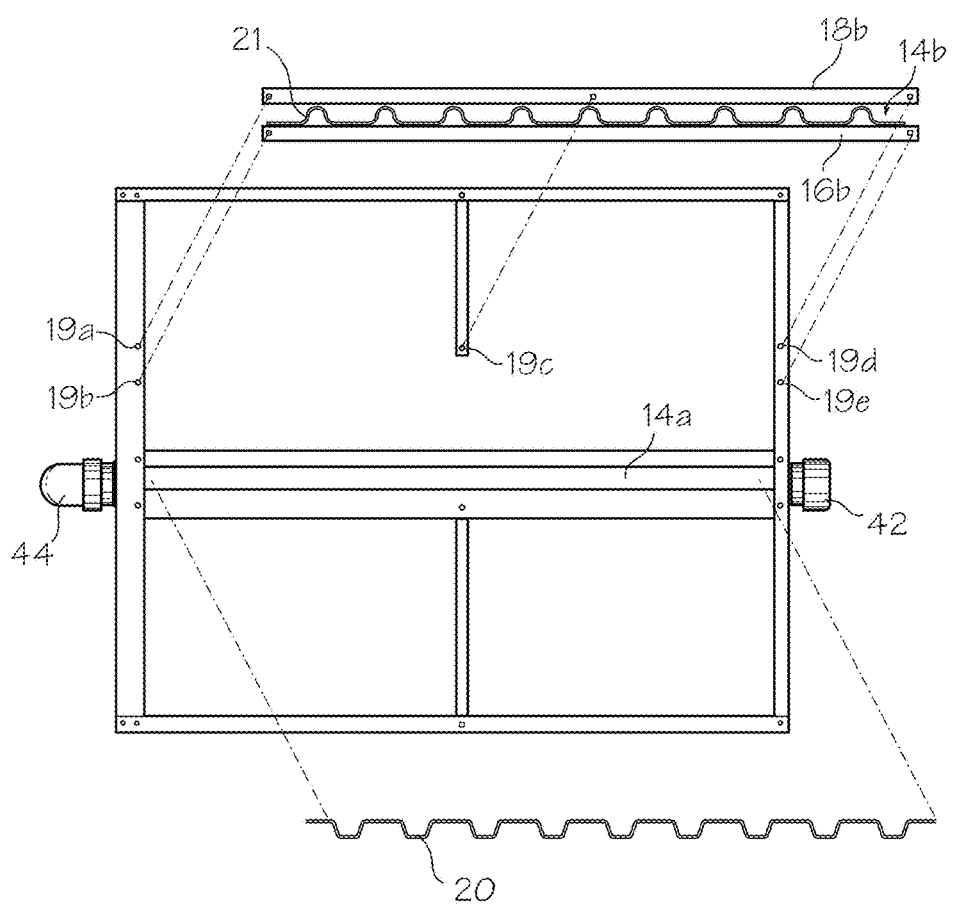
FIG. 8 shows a side elevation view of an embodiment of the present invention with an exploded view of the cutting slot.

In at least one embodiment, the upper boundaries 16a-16b and lower boundaries 18a-18b defining the first and second cutting slots 14a-14b are removably carried by longitudinal sides 12c and 12d. As can be seen in FIG. 8, the removable nature of the upper and lower boundaries allows for the easy interchange of a number of differently shaped cutting guides 21 so as to provide for a number of differently shaped cutting channels by simply removing the entire cutting slot. In such an embodiment, the upper and lower boundaries 16b and 18b of the cutting slot 14b can be detached by removal of five fasteners 19a-19e. Alternatively, the cutting guide 20 may be removed from within the cutting slot 14a and replaced with a cutting guide having a different cutting pattern.

The frame 12 further includes a cross-bar support member 30a that interconnects the lower boundary 18b of the first cutting slot 14a to latitudinal side 12b. In the shown embodiment, the frame further includes a second cross-bar support member 30b that interconnects the lower boundary 18b of the second cutting slot 14b to latitudinal side 12a. These cross-bar support members 30a-30b help support the weight of the wall board 10 that is being supported by the frame's upper surface.

As can be seen in FIGS. 1-2, the invention further includes a J-channel 32a disposed along at least a portion of the latitudinal side 12b. In the shown embodiment, the invention further includes at least one J-channel 34a disposed on longitudinal side 12c and at least one J-channel 34b disposed on longitudinal side 12d. In one embodiment, a J-channel (not shown) is also disposed along at least a portion of the latitudinal side 12a. These J-channels are adapted to receive an edge of the wall board 10 being supported by the upper surface of the frame and to hold the wall board in place while being cut. These J-channels may be removably attached to the frame or integral therewith. In alternate embodiments, however any number of clamping techniques that are generally known could be used to secure the wall board to the frame.

Figure 7:
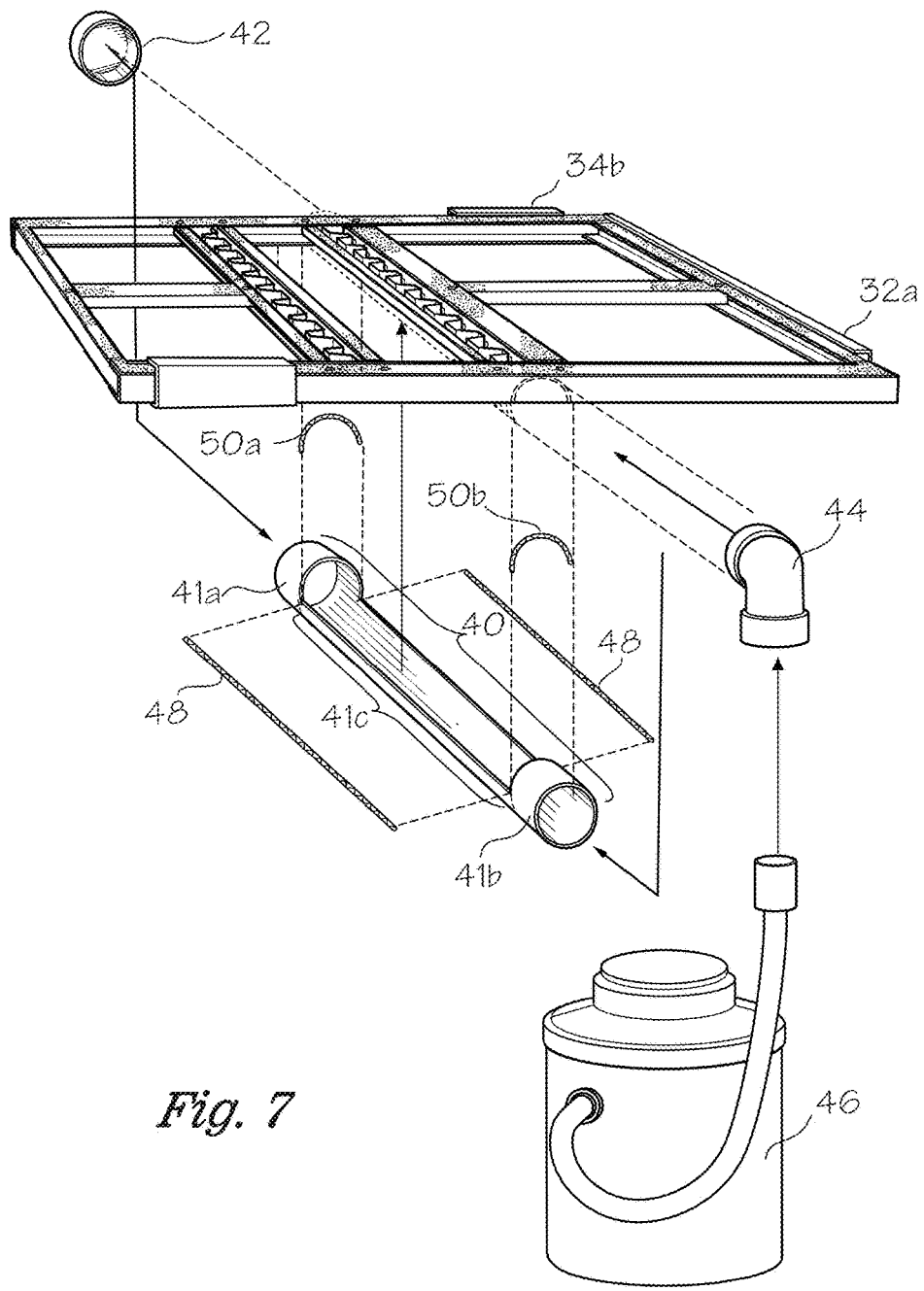
FIG. 7 shows a perspective view of an embodiment of the present invention with an exploded view of the dust collection conduit.

Referring now to FIGS. 4 and 7-8, another aspect of the present invention can be seen. A dust collection conduit 40 is disposed along the underside of the upper and lower boundaries 16a and 18a of the first cutting slot 14a and/or carried by the longitudinal sides 12c and 12d of the frame 12. The dust collection conduit 40 has a first end 41a and a second end 41b, both of which have a circular shaped cross section. The first end 41a is generally closed or sealed and in the shown embodiment, includes a closed end cap 42. The second end 41b is adapted to connect to a vacuum source 46 and in the shown embodiment, includes an adapter 44 that connects the second end 41b to the vacuum source 46. The dust collection conduit 40 also has at least a portion 41c that defines generally semi-circular or U shaped cross section. This generally semicircular or U shape allows dust to be collected by the dust collection conduit as the dust falls through the first cutting slot. Preferably, the U shaped portion 41c of the dust collection conduit extends along the entire length of the first cutting slot 14a. The dust collection conduit is carried by the under surface of the first cutting slot's upper and lower boundaries 16a and 18a so that the dust collection conduit catches any dust from the wall board being cut that falls through the cutting slot 14a. Any dust that is collected by the dust collection conduit 40 may them be removed by the vacuum source 46. A seal 48 is disposed between the dust collection conduit 40 and the underside of the upper and lower boundaries 16a and 18a of the cutting slot 14a. Similarly a seal 50a and 50b is provided generally adjacent to each end 41a and 41b of the dust collection conduit 40. The seals 48, 50a and 50b are provided to fill any gaps existing between the dust collection conduit and the frame 12, including the upper and lower boundaries 16a and 18a of the first cutting slot 14a, so as to allow the vacuum to create a sufficiently negative pressure (i.e. suction) within the dust collection conduit to remove the dust collected therein.

In one embodiment, the dust collection conduit is permanently attached to the upper and lower boundaries 16a and 16b such that removal of the entire cutting slot 14a (by removal of the upper and lower boundaries 16a and 18a) would also remove the dust collection conduit 40 from the frame. In alternate embodiments, however, the dust collection conduit is carried by the frame 12 and is removably attached to the upper and lower boundaries 16a and 16b such that the dust collection conduit 40 would remain attached to the frame 12 even when upper and lower boundaries 16a and 16b were removed. In yet another embodiment, the dust collection conduit is slideably carried by the frame and removably attached to upper and lower boundaries 16a and 16b so that the dust collection conduit can be placed under either of the cutting slots 14a and 14b by sliding the dust collection conduit into place. In this embodiment, the ends 41a and 41b of the dust collection conduit 40 and the corresponding seals 50a and 50b would have to be friction fit to the frame so that dust collection conduit remains in place during use but can be moved between cutting slots 14a and 14b when desired.

The invention further includes a surface sealing mechanism 52 that is disposed along the upper surface of the frame 12, including the upper surface of the upper boundaries 16a and 16b and the lower boundaries 18a and 18b of the cutting slots 14a and 14b. This surface sealing mechanism 52 serves two purposes. First, it provides a frictional surface to help prevent the wall board 10 from slipping or sliding across the frame 12 while being cut. Second, sealing mechanism 52 provides a substantially uniform and level surface on which the wall board may rest when being cut. By doing so, the sealing mechanism creates a generally air-tight seal between the wall board 10 and the cutting slot 14a as to allow the vacuum 46 to create a sufficiently negative pressure (i.e. suction) within the dust collection conduit 40 to remove any dust collected therein. Obviously, it is unlikely that any of the seals included in the invention will provide a perfectly air-tight seal but will instead create sufficiently air-tight seals so as to put the cutting slot 14a in fluid communication with the vacuum source 14 so that any dust that falls through the cutting slot 14a, will be contained within the dust collection conduit 40 and removed by the vacuum source 46. As the wall board is cut, gaps in the wall board are created through which air may travel, thus increasing the volume of air and/or the velocity with which the air travels through the dust collection conduit 40 and into the vacuum source 46, thus, aiding the vacuum source in removing the dust collected in the dust collection conduit 40.

Figure 9A:
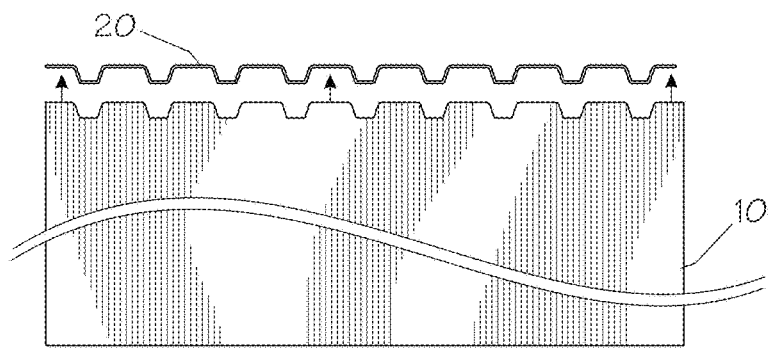
FIGS. 9A and 9B show a side elevation view of wall board that is cut in accordance with an embodiment of the present invention It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.
Figure 9B:
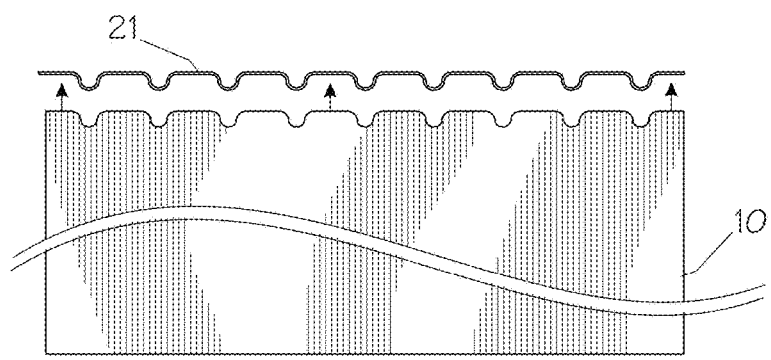

Referring now to FIG. 9A-9B, wall board 10 that has been cut using the present invention is shown. As can be seen, the pattern cut into the wall board is dictated by the pattern of the cutting guide 20 and 21. By switching the cutting guide as described below, the user is able to cut wall board having a number of different patterns.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. An apparatus for assisting with the cutting of a piece of wall board comprising:
   a frame comprising a first longitudinal side, an opposing second longitudinal side a first latitudinal side and an opposing latitudinal side, wherein said frame defines an upper surface adapted to receive and support a piece of wall board and a lower surface;
   a first cutting slot carried by said first and said second longitudinal sides of said frame said cutting slot being defined by an upper boundary and a lower boundary;
   a first fluted cutting guide defining at least one peak and at least one trough, wherein said guide is carried by one of said upper boundary and said lower boundary of said first cutting slot so that only one of said at least one peak and said at least one trough contacts one of said upper boundary and said lower boundary of said first cutting slot;
   a first cutting channel defined by said first fluted cutting guide and at least one of said upper and said lower boundary of said first cutting slot, wherein said first cutting channel is adapted to receive a cutting tool and to guide the cutting tool along said at least on peak and said at least one trough of said first cutting guide while the cutting tool is cutting the wall board;
   a dust collection conduit having a first end, a second end and a cross section that defines a substantially U shape, wherein said dust collection conduit is carried by said lower surface of said frame so that said dust collection conduit catches any dust from the wall board being cut that falls through said first cutting slot and said dust collection conduit creates a seal with a lower surface of said upper boundary and said lower boundary of said first cutting slot;
   a seal disposed on said first end of said dust collection conduit;
   a vacuum adapter disposed on said second end of said dust collection conduit so that when said vacuum adapter connects to a vacuum source, said dust collection conduit and said cutting slot are placed in fluid communication with the vacuum source so that dust collected by said dust collection conduit can be removed by the vacuum source; and,
   a sealing mechanism carried by at least a portion of said upper surface of said frame, said sealing mechanism being adapted to create a seal between said cutting slot and the wall board when the wall board is received by said upper surface of said frame.

2. The apparatus of claim 1 further comprising an extension frame connected to said frame, said extension frame comprising a first longitudinal side and a second opposing longitudinal side and a latitudinal side extending between said first and said second longitudinal sides of said extension frame;
   a second cutting slot carried by said first and said second longitudinal sides of said extension frame so that said second cutting slot is generally parallel to said first cutting slot and said second cutting slot is defined by an upper boundary and a lower boundary;
   a second fluted cutting guide defining at least one peak and at least one trough, wherein said second cutting guide is carried by one of said upper boundary and said lower boundary of said second cutting slot so that only one of said at least one peak and said at least one trough of said second cutting guide contacts one of said upper boundary and said lower boundary of said second cutting slot; and
   a second cutting channel defined by said second fluted cutting guide and one of said upper and said lower boundary of said second cutting slot, wherein said second cutting channel is adapted to receive a cutting tool and to guide the cutting tool along said at least one peak and said at least one trough of said second fluted cutting guide while the cutting tool is cutting the wall board.

3. The apparatus of claim 2 wherein said first cutting slot is positioned such that the distance between said first latitudinal side of said frame and said first cutting slot is greater than the distance between said latitudinal side of said extension frame and said second cutting slot.

4. The apparatus of claim 2 wherein said second fluted cutting guide is positioned such that said second cutting channel mirrors said first cutting channel.

5. The apparatus of claim 1 wherein said at least one peak defined by said first fluted cutting guide is removably carried by said upper boundary of said first cutting slot so that said first cutting channel is defined by said first fluted cutting guide and said lower boundary of said first cutting slot.

6. An apparatus for assisting with the cutting of a piece of wall board comprising:
   a frame comprising a first longitudinal side, an opposing second longitudinal side a first latitudinal side and an opposing second latitudinal side, wherein said frame defines an upper surface adapted to receive and support a piece of wall board and a lower surface;
   a first cutting slot carried by said first and said second longitudinal sides of said frame so that said cutting slot is disposed adjacent to said second latitudinal side of said frame, said cutting slot being defined by an upper boundary and a lower boundary;
   a first fluted cutting guide defining at least one peak and at least one trough, wherein said first cutting guide is carried by one of said upper boundary and said lower boundary of said first cutting slot so that only one of said at least one peak and said at least one trough contacts one of said upper boundary and said lower boundary of said cutting slot; and
   a first cutting channel defined by said fluted cutting guide and one of said upper boundary and said lower boundary of said first cutting slot, wherein said cutting channel is adapted to receive a cutting tool and to guide the cutting tool along said first cutting guide while cutting the wall board.

7. The apparatus from claim 6 further comprising a dust collection conduit having a first end, a second end and a cross section that defines a substantially U shape, wherein said dust collection conduit is carried by said lower surface of said frame so that said dust collection conduit catches any dust falling from said first cutting slot and said dust collection conduit creates a seal between said dust collection conduit and a lower surface of said upper boundary and a lower surface of said lower boundary of said first cutting slot;
   A seal disposed on said first end of said dust collection conduit;
   a vacuum adapter disposed on said second end of said dust collection conduit so that when said vacuum adapter connects to a vacuum source, said dust collection conduit and said cutting slot are placed in fluid communication with the vacuum source so that dust collected by said dust collection conduit can be removed by the vacuum source; and, a substantially flat sealing mechanism carried by an upper surface of said upper boundary and said lower boundary of said first cutting slot, said sealing mechanism being adapted to substantially create a seal between said upper boundary and lower boundary of said cutting slot and the wall board when the wall board is received by said upper surface of said frame.

8. The apparatus of claim 6 further comprising an extension frame connected to said frame, said extension frame comprising two opposing longitudinal sides and a latitudinal side extending between said two opposing longitudinal sides of said extension frame;

a second a cutting slot carried by said extension frame and positioned so that said second cutting slot extends generally parallel to said first cutting slot, and said second cutting slot is defined by an upper boundary and a lower boundary;

a second fluted cutting guide defining at least one peak and at least one trough, wherein said second cutting guide is carried by one of said upper boundary and said lower boundary of said second cutting slot so that only one of said at least one peak and said at least one trough of said second cutting guide contacts one of said upper boundary and said lower boundary of said second cutting slot; and a second cutting channel defined by said second fluted cutting guide and at least one of said upper and said lower boundary of said second cutting slot, wherein said second cutting channel is adapted to receive a cutting tool and to guide the cutting tool along said second cutting guide while the cutting tool is cutting the wall board.

9. The apparatus of claim 8 wherein said first cutting slot is position such that the distance between said first latitudinal side of said frame and said first cutting slot is greater than the distance between said latitudinal side of said extension frame and said second cutting slot.

10. The apparatus of claim 8 wherein said second fluted cutting guide is positioned such that said second cutting channel mirrors said first cutting channel.

11. The apparatus of claim 6 wherein said at least one peak defined by said first fluted cutting guide has a width that is greater than the width of said at least one trough defined by said first fluted cutting guide and said at least one peak is removably carried by said upper boundary of said first cutting slot so that said first cutting channel is defined by said first fluted cutting guide and said lower boundary of said first cutting slot.

12. The apparatus of claim 11 wherein said second fluted cutting guide is positioned such that said second cutting channel mirrors said first cutting channel.

13. An apparatus for assisting with the cutting of a piece of wall board comprising:

a frame comprising a first longitudinal side, an opposing second longitudinal side a first latitudinal side and an opposing second latitudinal side, wherein said frame defines an upper surface adapted to receive and support a piece of wall board and a lower surface;

a first cutting slot carried by said first and said second longitudinal sides of said frame, wherein said first cutting slot is defined by an upper boundary and a lower boundary and has an upper surface for supporting the wall board and a lower surface;

a second cutting slot carried by said extension frame and positioned so that said second cutting slot extends generally parallel to said first cutting slot, and said second cutting slot is defined by an upper boundary and a lower boundary; and, a dust collection conduit having a first end, a second end and a cross section that defines a substantially U shape, wherein said dust collection conduit is carried by said lower surface of said frame so that said dust collection conduit catches any dust that falls through said cutting slot and said dust collection conduit creates an air tight seal at the points of contacts with said lower surface of said first cutting slot.

14. The apparatus of claim 13 further comprising a vacuum adapter disposed on said second end of said dust collection conduit so that when said vacuum adapter connects said dust collection conduit to a vacuum source, said dust collection conduit and said cutting slot are placed in fluid communication with the vacuum source so that dust collected by said dust collection conduit can be removed by the vacuum source; and, a sealing mechanism carried by an upper surface of said upper boundary and said lower boundary of said first cutting slot, said sealing mechanism being adapted to create a seal between said first cutting slot and the wall board when the wall board is received by said upper surface of said frame.

15. The apparatus of claim 13 further comprising a first fluted cutting guide defining at least one peak and at least one trough, wherein said first cutting guide is carried by one of said upper boundary and said lower boundary of said first cutting slot so that only one of said at least one peak and said at least one trough contacts one of said upper boundary and said lower boundary of said first cutting slot; and a first cutting channel defined by said first cutting guide and at least one of said upper and said lower boundary of said first cutting slot, wherein said first cutting channel is adapted to receive a cutting tool and to guide the cutting tool along said at least one peak and said at least one trough of said first cutting guide while the cutting tool is cutting the wall board.

16. The apparatus of claim 15 wherein said at least one peak defined by said first fluted cutting guide has a width that is greater than the width of said at least one trough defined by said first fluted cutting guide and said ate least one peak is removably carried by said upper boundary of said first cutting slot so that said first cutting channel is defined by said first fluted cutting guide and said lower boundary of said first cutting slot.

17. The apparatus of claim 15 further comprising a second fluted cutting guide defining at least one peak and at least one trough, wherein said second cutting guide is carried by one of said upper boundary and said lower boundary of said second cutting slot so that only one of said at least one peak and said at least one trough of said second cutting guide contacts one of said upper boundary and said lower boundary of said second cutting slot;

a second cutting channel defined by said second fluted cutting guide and at least one of said upper and said lower boundary of said second cutting slot, wherein said second cutting channel is adapted to receive a cutting tool and to guide the cutting tool along said at least one peak and said at least one trough of said second fluted cutting guide while the cutting tool is cutting the wall board.

18. The apparatus of claim 17 wherein said second fluted cutting guide is positioned such that said second cutting channel mirrors said first cutting channel.

19. The apparatus of claim 17 wherein said at least one peak defined by said first fluted cutting guide has a width that is greater than the width of said at least one trough defined by said first fluted cutting guide and said at least one peak is removably carried by said upper boundary of said first cutting slot so that said first cutting channel is defined by said first fluted cutting guide and said lower boundary of said first cutting slot and said second fluted cutting guide is positioned such that said second cutting channel mirrors said first cutting channel.

20. The apparatus of claim 13 wherein said first cutting slot is position such that the distance between said first latitudinal side of said frame and said first cutting slot is greater than the distance between said second latitudinal side of said frame and said second cutting slot.

* * * * *